United States Patent
Sheedy et al.

(10) Patent No.: US 10,794,211 B2
(45) Date of Patent: Oct. 6, 2020

(54) SEAL GEOMETRIES FOR REDUCED LEAKAGE IN GAS TURBINES AND METHODS OF FORMING

(71) Applicant: United Technologies Corporation, Farmington, CT (US)

(72) Inventors: Paul M. Sheedy, Bolton, CT (US); Changsheng Guo, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 74 days.

(21) Appl. No.: 16/090,893

(22) PCT Filed: Apr. 10, 2017

(86) PCT No.: PCT/US2017/026810
§ 371 (c)(1),
(2) Date: Oct. 3, 2018

(87) PCT Pub. No.: WO2017/177229
PCT Pub. Date: Oct. 12, 2017

(65) Prior Publication Data
US 2019/0107003 A1    Apr. 11, 2019

Related U.S. Application Data

(60) Provisional application No. 62/320,391, filed on Apr. 8, 2016.

(51) Int. Cl.
*F01D 11/12*    (2006.01)
*F04D 29/52*    (2006.01)
(Continued)

(52) U.S. Cl.
CPC .......... *F01D 11/122* (2013.01); *F01D 25/183* (2013.01); *F02C 7/28* (2013.01);
(Continued)

(58) Field of Classification Search
CPC .... F01D 11/122; F01D 11/125; F04D 29/526; F05D 2240/11; F05D 2250/181; F05D 2230/90; F02C 7/28
See application file for complete search history.

(56) References Cited

U.S. PATENT DOCUMENTS 4,148,494 A * 4/1979 Zelahy .................... F01D 11/02
                                                                 277/415
6,203,021 B1    3/2001 Wolfla et al.
(Continued)

FOREIGN PATENT DOCUMENTS

EP    1985805 A1    10/2008
EP    2444515 A2    4/2012
(Continued)

OTHER PUBLICATIONS

European Search Report dated Oct. 15, 2019 for European Patent Application No. 17779974.9.
(Continued)

*Primary Examiner* — Ninh H. Nguyen
(74) *Attorney, Agent, or Firm* — Bachman & LaPointe, P.C.

(57) ABSTRACT

A turbomachine sealing component has: a substrate having circumferential surface; and a coating on the circumferential surface. The coating or a layer thereof is patterned to form circumferential sealing ridges.

20 Claims, 8 Drawing Sheets

(51) Int. Cl.
 *F01D 25/18* (2006.01)
 *F02C 7/28* (2006.01)
(52) U.S. Cl.
 CPC ........ *F04D 29/526* (2013.01); *F05D 2230/31* (2013.01); *F05D 2230/90* (2013.01); *F05D 2240/11* (2013.01); *F05D 2250/181* (2013.01); *Y02T 50/672* (2013.01)

(56) References Cited

U.S. PATENT DOCUMENTS

| | | | |
|---|---|---|---|
| 6,830,428 B2 | 12/2004 | Le Biez et al. | |
| 6,887,528 B2 | 5/2005 | Lau et al. | |
| 7,448,843 B2* | 11/2008 | Pilecki, Jr. | F01D 11/001 |
| | | | 415/1 |
| 8,017,240 B2 | 9/2011 | Strock | |
| 8,038,388 B2* | 10/2011 | Freling | F01D 11/001 |
| | | | 415/174.4 |
| 8,061,978 B2 | 11/2011 | Tholen et al. | |
| 8,770,926 B2* | 7/2014 | Guo | C23C 4/18 |
| | | | 415/173.4 |
| 8,770,927 B2* | 7/2014 | Strock | F01D 11/122 |
| | | | 415/173.4 |
| 8,936,432 B2 | 1/2015 | Strock | |
| 9,243,511 B2* | 1/2016 | Lee | F01D 11/122 |
| 9,297,269 B2 | 3/2016 | Morrison et al. | |
| 2002/0197155 A1 | 12/2002 | Howard et al. | |
| 2009/0148278 A1 | 6/2009 | Allen | |
| 2013/0017072 A1 | 1/2013 | Ali et al. | |
| 2015/0240652 A1 | 8/2015 | Lee et al. | |
| 2016/0040272 A1 | 2/2016 | Pandey | |
| 2016/0122552 A1* | 5/2016 | Strock | C09D 7/69 |
| | | | 60/805 |
| 2017/0175560 A1* | 6/2017 | Merrill | F01D 11/122 |

FOREIGN PATENT DOCUMENTS

| | | |
|---|---|---|
| EP | 2455589 A1 | 5/2012 |
| EP | 2947276 A1 | 11/2015 |
| WO | 2015130519 A1 | 9/2015 |
| WO | 2015/173312 A1 | 11/2015 |

OTHER PUBLICATIONS

International Search Report and Written Opinion dated Jun. 27, 2017 for PCT Patent Application No. PCT/US2017/026810.

* cited by examiner

SEAL GEOMETRIES FOR REDUCED LEAKAGE IN GAS TURBINES AND METHODS OF FORMING

CROSS-REFERENCE TO RELATED APPLICATION

Benefit is claimed of U.S. Patent Application No. 62/320, 391, filed Apr. 8, 2016, and entitled "Seal Geometries for Reduced Leakage in Gas Turbines and Methods of Forming", the disclosure of which is incorporated by reference herein in its entirety as if set forth at length.

BACKGROUND

The disclosure relates to turbomachines. More particularly, the disclosure relates to air seal coatings.

Managing blade tip/seal clearance control is critical for reducing air leakage and for improving the efficiency of gas turbine engines. From the fan, to the low and high compressors, to the high and low turbines, there are many unique challenges in optimizing these blade/seal rub systems. In most instances, it is desirable for the rotating component to wear or 'cut' into the stationary component on which a sacrificial coating is typically deposited (i.e., abradable seal). The abradable material couples vary depending on location in the engine and typically must achieve a balance of properties such as abradability, erosion resistance, thermal properties, etc., which often times exhibit conflicting responses. During service, the abradable systems may exhibit excessive blade tip wear, material transfer from the blade to the seal, material transfer from the seal to the blade tip, etc. and with these events, significant heat generation, as well as loss of performance. In many instances to prevent such situations, expensive blade tipping processes are required to provide sufficient 'cutting' of the abradable. As such, there are significant challenges to designing a rub system which delivers on all the requirements.

Exemplary systems include those in U.S. Pat. No. 8,017, 240, to Strock, Sep. 13, 2011, "Ternary carbide and nitride thermal spray abradable seal material", the disclosure of which in incorporated by reference in its entirety herein as if set forth at length. U.S. Pat. No. 8,936,432, to Strock, Jan. 20, 2015, "Low density abradable coating with fine porosity", the disclosure of which in incorporated by reference in its entirety herein as if set forth at length discloses rotor coatings interfacing with vanes.

Additionally, U.S. Pat. Nos. 6,830,428, 6,887,528, and U.S. Patent Application Publication No. 2013/0017072 disclose patterned abradable seal material.

SUMMARY

One aspect of the disclosure involves a turbomachine sealing component comprising: a substrate having a circumferential surface; and a coating on the circumferential surface. The coating or a layer thereof is patterned to form circumferential sealing ridges.

Further embodiments may additionally and/or alternatively include the patterning being patterning with varying thickness.

Further embodiments may additionally and/or alternatively include the patterning comprising a layer formed of discrete ridges physically discontinuous from each other so as to be separated from each other by axial gaps.

Further embodiments may additionally and/or alternatively include the patterning comprising a layer formed of discrete ridges physically continuous with each other via less thick portions of the same material.

Further embodiments may additionally and/or alternatively include the coating comprising a bondcoat and an additional layer.

Further embodiments may additionally and/or alternatively include the additional layer comprising a metallic alloy (e.g., an MCrAlY), an intermetallic (e.g., TiAl), a ternary carbide (e.g., MAX phase alloys), and/or an oxide, nitride, or carbide ceramic (e.g., Al2O3, c-BN, SiC).

Further embodiments may additionally and/or alternatively include the pattern being formed in the bondcoat.

Further embodiments may additionally and/or alternatively include the pattern being formed in the additional layer.

Further embodiments may additionally and/or alternatively include the additional layer comprising a ceramic.

Further embodiments may additionally and/or alternatively include the additional layer comprising a metallic matrix and an abrasive addition.

Further embodiments may additionally and/or alternatively include the additional layer comprising not more than 12% porosity.

Further embodiments may additionally and/or alternatively include the varying thickness being between 1.0 mil and 40.0 mil, more particularly between 1.0 mil and 10.0 mil or between 10 mil and 40 mil.

Further embodiments may additionally and/or alternatively include the varying thickness being of ridges having widths of 60% to 250% of heights.

Further embodiments may additionally and/or alternatively include the varying thickness comprising ridges of 5.0% to 40.0% or 5.0% to 30% or 8.0% to 15.0% of a blade-swept area.

Further embodiments may additionally and/or alternatively include the turbomachine sealing component being a blade outer airseal wherein one or more of: the substrate is a nickel based superalloy; and the blade outer airseal is a segment of a ring.

Further embodiments may additionally and/or alternatively include a turbomachine including the blade outer airseal and further comprising a stage of blades adjacent the blade outer airseal.

Further embodiments may additionally and/or alternatively include the blade outer airseal being a segment of a blade outer airseal ring.

Further embodiments may additionally and/or alternatively include the turbomachine being a gas turbine engine wherein the blade outer airseal ring is in a turbine section.

Further embodiments may additionally and/or alternatively include the blades having nickel-based superalloy substrates.

Further embodiments may additionally and/or alternatively include the turbomachine sealing component being a turbomachine rotor having: said substrate with said surface as an outer diameter surface; and said coating on the outer diameter surface.

Further embodiments may additionally and/or alternatively include a method for manufacturing the turbomachine sealing component, the method comprising: forming the pattern via an additive process.

Further embodiments may additionally and/or alternatively include the additive process comprising at least one of microplasma spray, micro-cold spray, and direct write extrusion, and directed energy methods such as direct metal laser sintering, selective laser sintering or melting, electron beam melting, and the like.

Further embodiments may additionally and/or alternatively include: the additive process being in applying a bondcoat and the abradable is evenly applied atop the patterned bondcoat; or the bondcoat is evenly applied and the additive process is in applying the abradable.

Further embodiments may additionally and/or alternatively include a method for using the turbomachine sealing component, the method comprising: rubbing with an adjacent component.

Further embodiments may additionally and/or alternatively include the turbomachine sealing component being a blade outer airseal; and the adjacent component comprises tips of blades of a stage of blades.

Further embodiments may additionally and/or alternatively include the rubbing causing the pattern to cut grooves in tips of the blade.

Further embodiments may additionally and/or alternatively include the grooves being in a blade substrate.

Further embodiments may additionally and/or alternatively include the turbomachine sealing component being a turbomachine rotor and the adjacent component comprising vane inner diameter tips.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
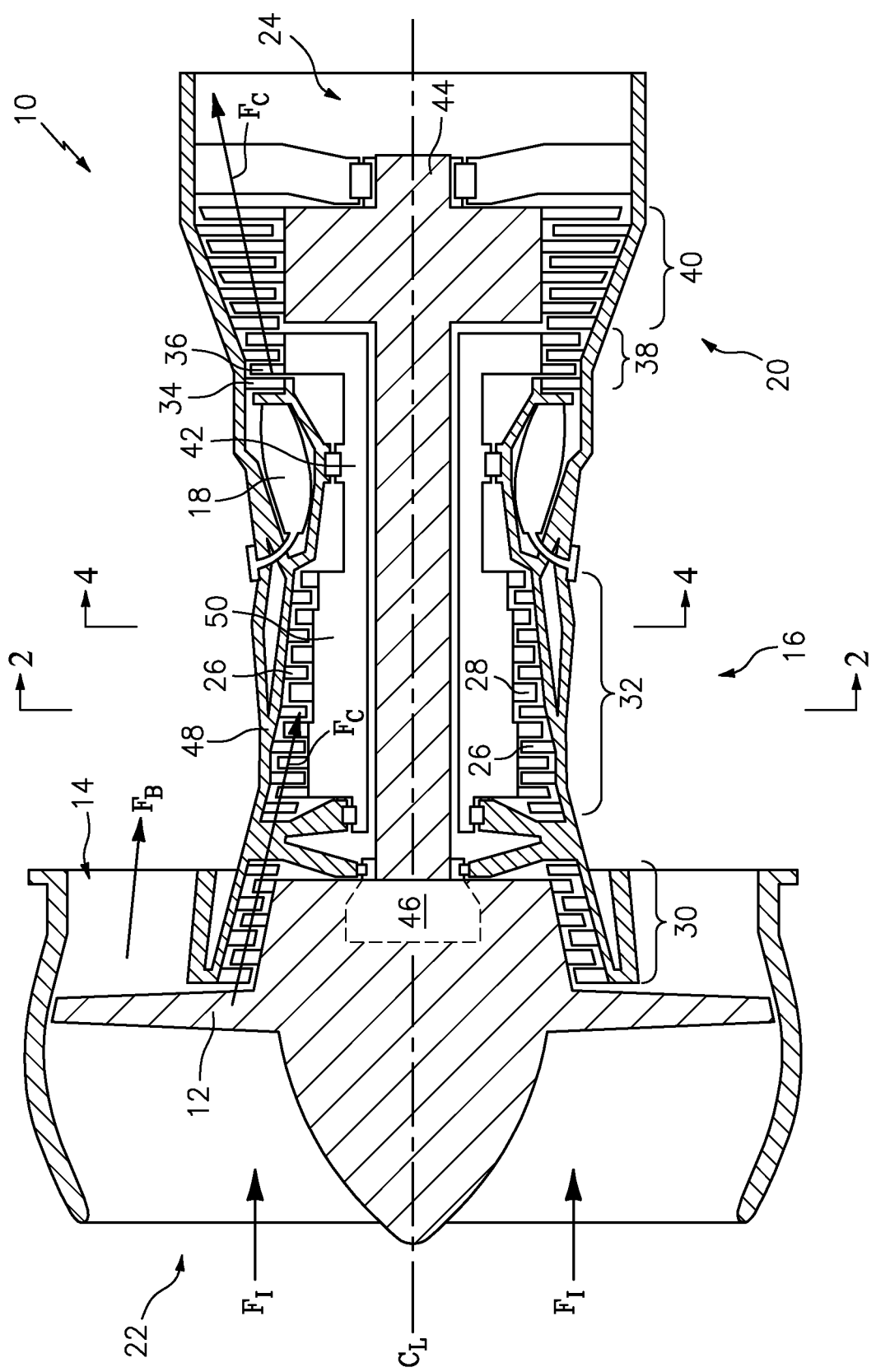
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (HPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 (or a portion of it) may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
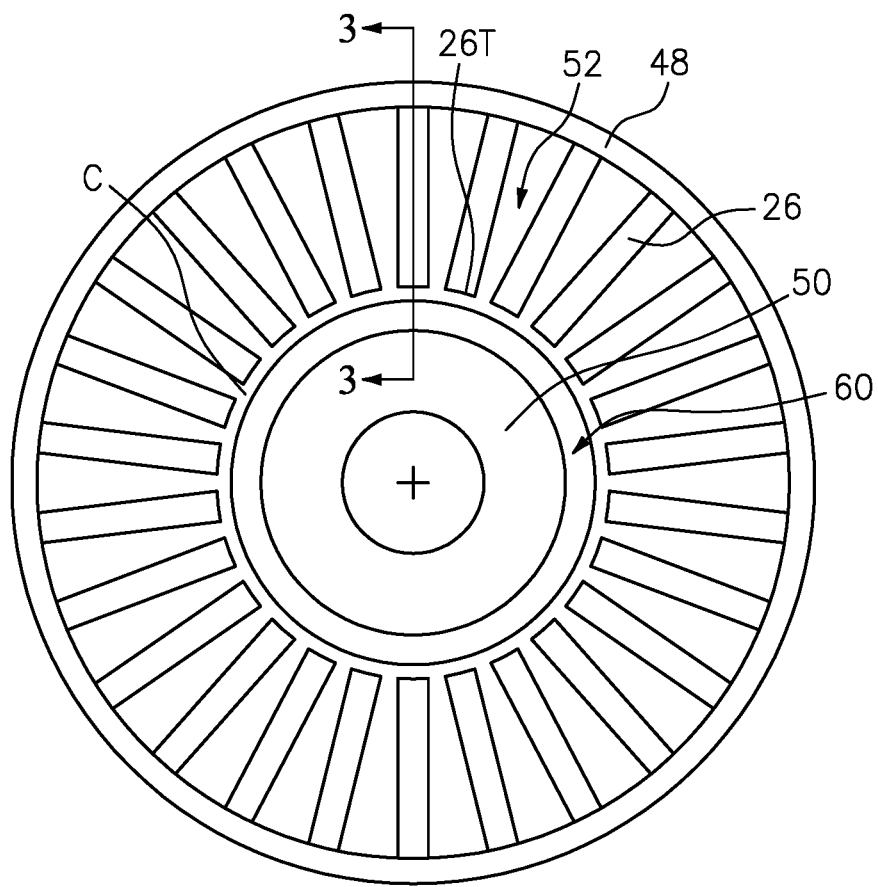
FIG. 2 illustrates a simplified cross-sectional view illustrating the relationship of the rotor and vanes taken along the line 2-2 of FIG. 1, not to scale.
Figure 3:
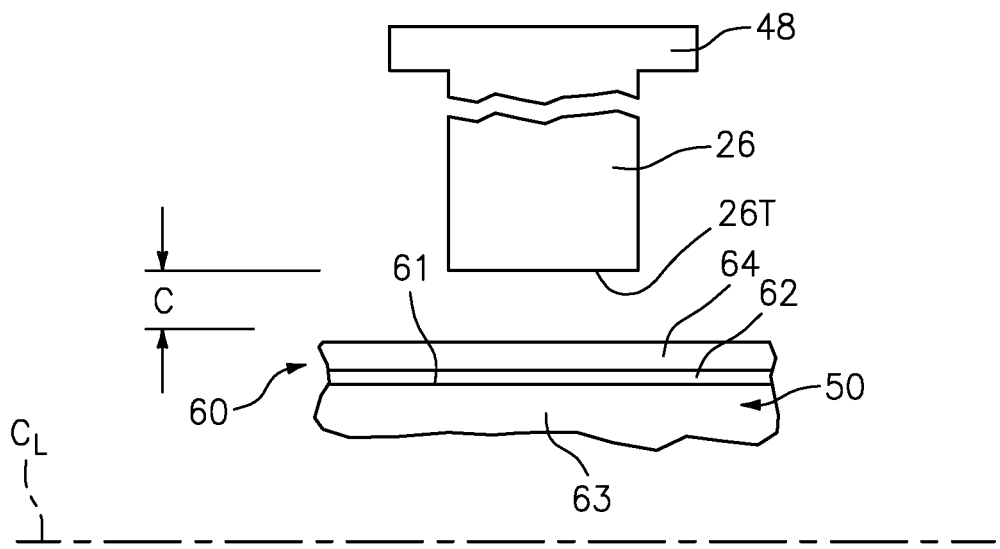
FIG. 3 is a cross-sectional view taken along the line 3-3 of FIG. 2, not to scale.
Figure 4:
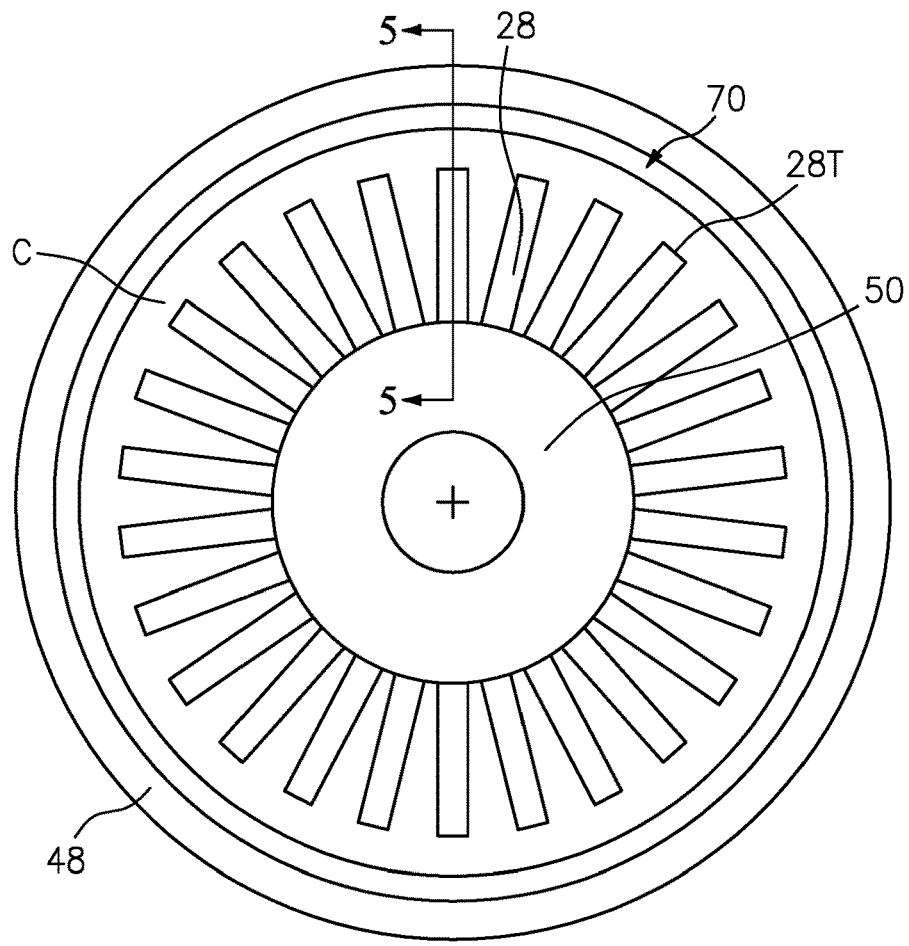
FIG. 4 illustrates a simplified cross-sectional view illustrating the relationship of the casing or shroud and blades taken along the line 4-4 of FIG. 1, not to scale.
Figure 5:
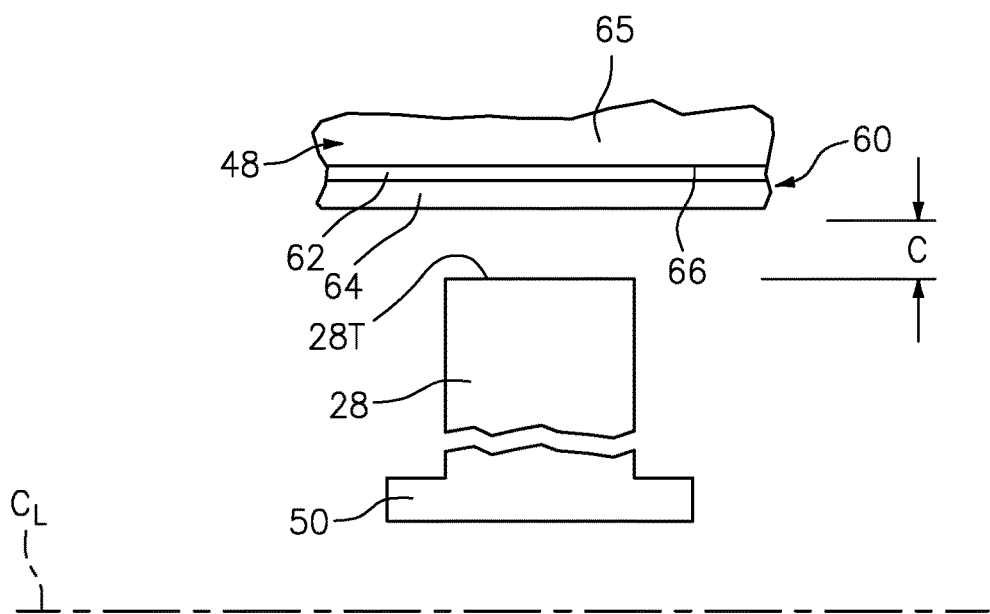
FIG. 5 is a cross-sectional view taken along the line 5-5 of FIG. 4, not to scale.

FIG. 2 and FIG. 3 disclose the sealing system with respect to interaction of a stator vane with a rotor. FIG. 4 and FIG. 5 disclose the sealing system with respect to interaction of a rotor blade with a stator casing or shroud. The coating may be used with either or both configurations.

FIG. 2 is a cross section along line 22 of FIG. 1 of a casing 48 which has a rotor shaft 50 inside. Vanes 26 are attached to casing 48 and the gas path 52 is shown as the space between vanes 26. Coating 60, is on rotor shaft 50 such that the clearance C between coating 60 and vane tips 26T of vanes 26 has the proper tolerance for operation of the engine, e.g., to serve as a seal to prevent leakage of air (thus reducing efficiency), while not interfering with relative movement of the vanes and rotor shaft. In FIGS. 2 and 3, clearance C is expanded for purposes of illustration. In practice, clearance C may be, for example, in a range of about 25 to 55 mils (635 to 1397 microns) when the engine is cold and 0 to 35 mils (0 to 900 microns) during engine operation depending on the specific operating condition and previous rub events that may have occurred.

FIG. 3 shows the cross section along line 3-3 of FIG. 2, with casing 48 and vane 26. Coating 60 is attached to rotor shaft 50, with a clearance C between coating 60 and vane tip 26T of vane 26 that varies with operating conditions, as described herein.

FIG. 3 shows bi-layer coating (coating system) 60 which includes metallic bond coat 62 and abradable/abrasive layer 64. Metallic bond coat 62 is applied to the outer diameter (OD) surface 61 of the substrate 63 of the rotor shaft 50. Abradable/abrasive layer 64 is deposited on top of bond coat 62 and is the layer that first encounters vane tip 26T. As is discussed further below, the coating system is patterned to assist in sealing to provide a sealing system.

As can be seen from FIG. 4 and FIG. 5, the same concept is used in which coating 60 is provided on the inner diameter (ID) surface 66 of a substrate 65 casing or shroud 48. Coating 60 includes a first metallic bond coat 62 that has been applied to the ID of the substrate 65 stator casing 48. In other embodiments, stator casing 48 includes a shroud that forms a blade air seal (BOAS) segment discussed below. Abradable/abrasive layer 64 is formed on bond coat 62 and is the layer that first encounters rotor tip 28T.

Figure 6:
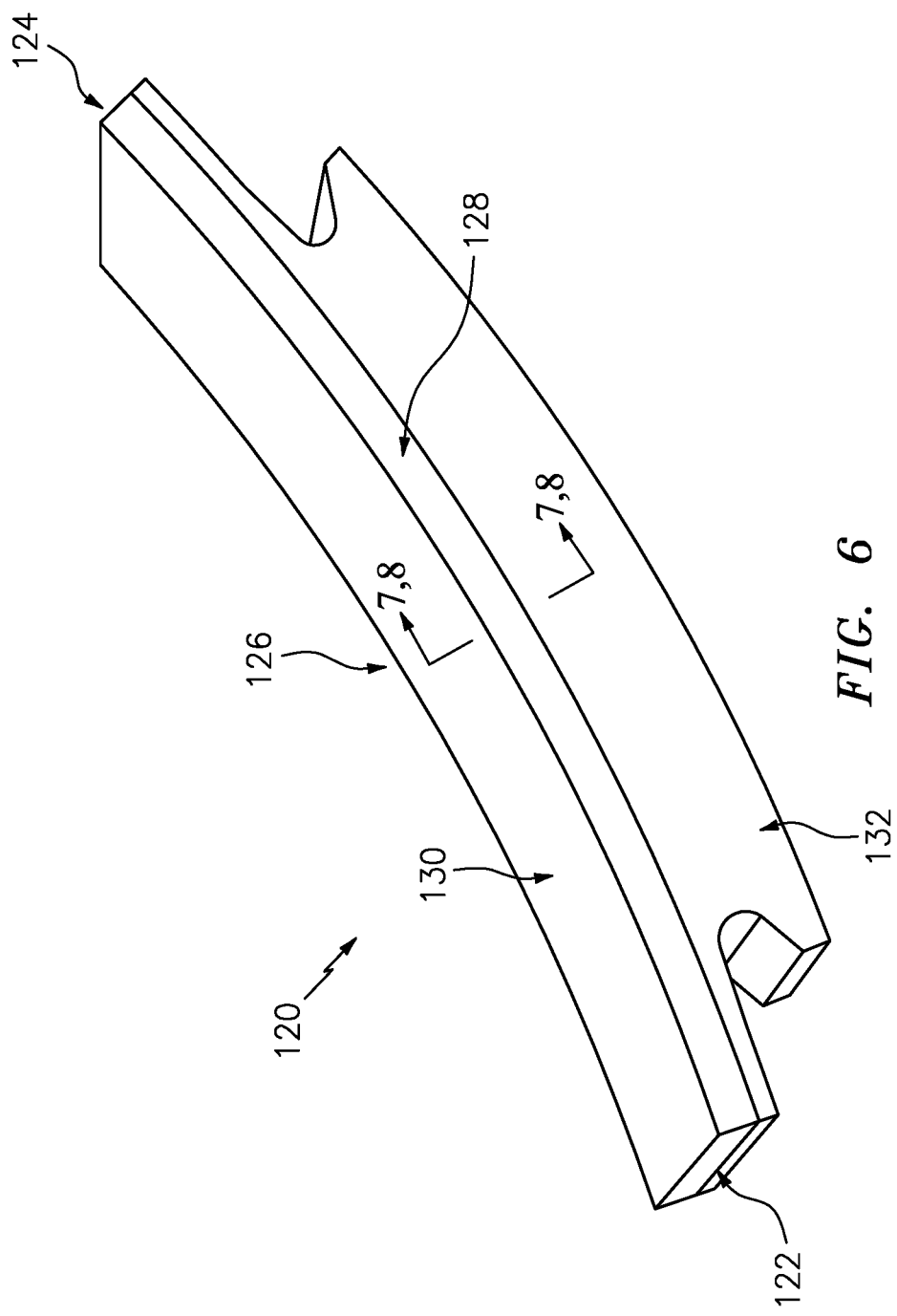
FIG. 6 is a view of a blade outer airseal (BOAS) segment.

FIG. 6 is a view of a blade outer airseal (BOAS) segment 120. A circumferential array (ring) of the segments may form the shroud. Accordingly, each segment extends between a first circumferential end 122 and a second circumferential end 124 and has a first longitudinal end 126 and a second longitudinal end 128. An inner diameter (ID) surface 130 is formed by the coating discussed above. Radially outward, there may be a mounting feature 132.

Figure 7:
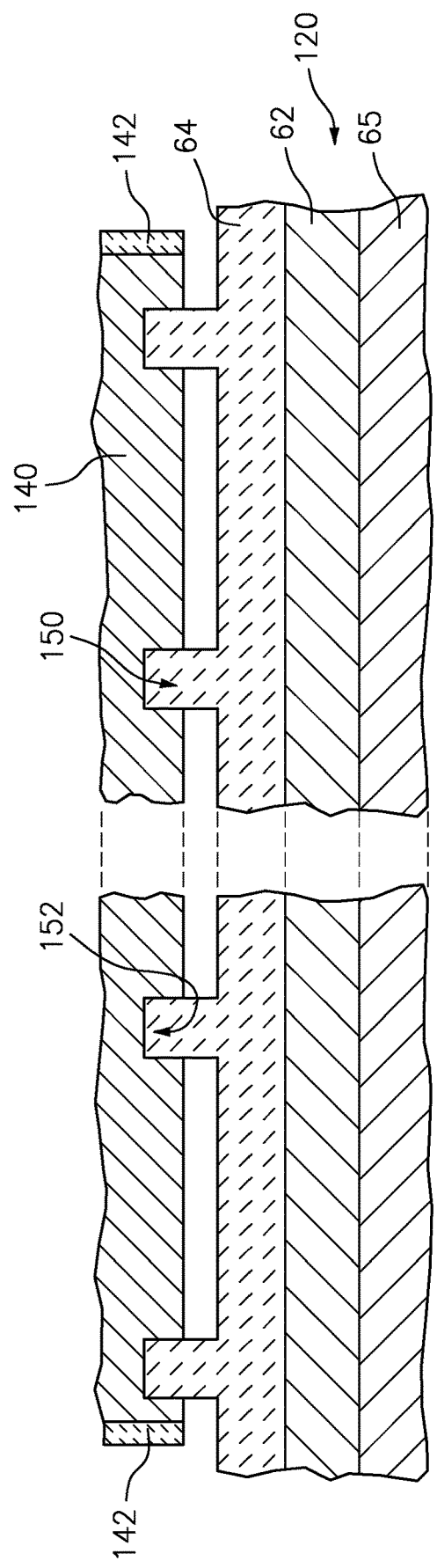
FIG. 7 is a schematic partial sectional view of a first coating on the BOAS segment of FIG. 6 showing blade sweep.

FIG. 7 is a schematic partial sectional view of a first coating on the BOAS segment of FIG. 6 showing blade sweep. The coating has circumferential ridges 150 formed in the abradable/abrasive layer 64. These ridges cut into the adjacent blade tips forming grooves 152. Particularly for uncoated tips, the ridges will cut into blade substrate 140 at the tip. FIG. 7 also shows a ceramic thermal barrier coating (TBC) 142 along the lateral perimeter of the airfoil (i.e., the pressure side and suction side). With abradable coated tips (not shown), the ridges will at least cut into the coating and may cut into the substrate. FIG. 7 (and FIGS. 8-10 below) is equally representative of the ridged coating being on a rotor (e.g., metallic spacer between blade stages) outer diameter surface cutting into inner diameter tips of either stator vane airfoils or of airfoils of a counter-rotating blade stage.

Figure 11:
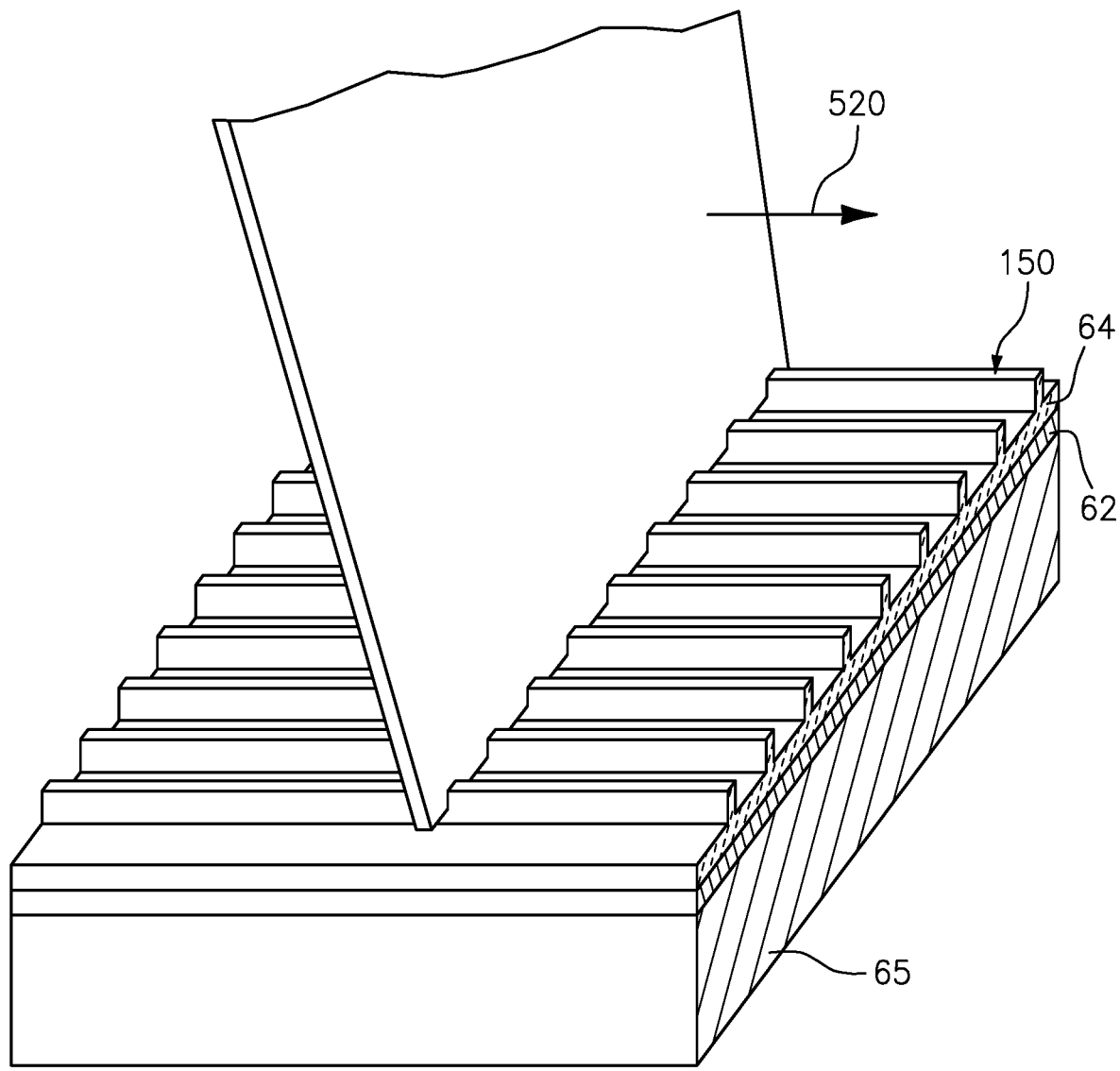
FIG. 11 is a schematic illustration of blade sweep.
Figure 12:
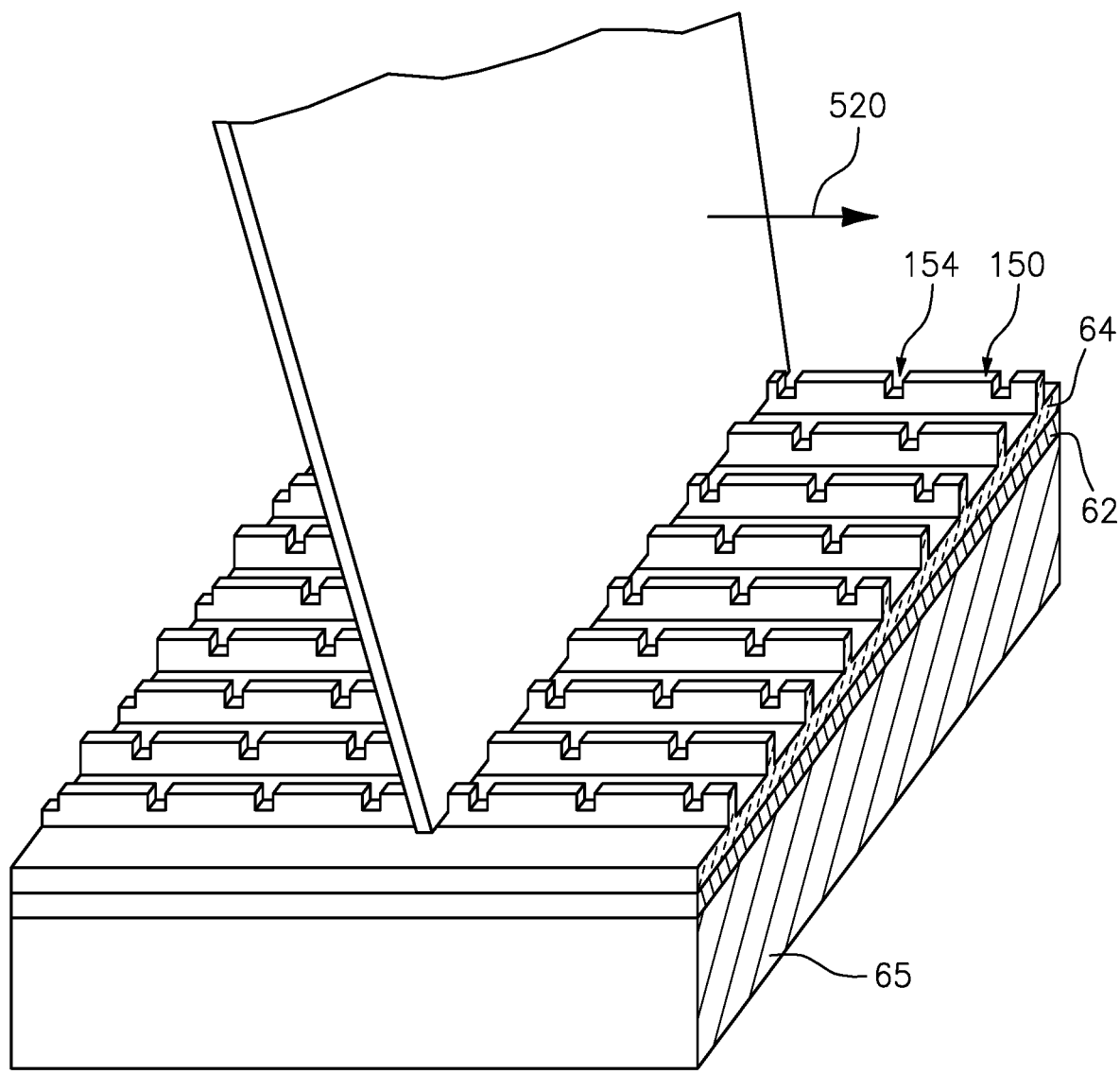
FIG. 12 is a schematic illustration of blade sweep with interrupted ridges.

FIG. 11 is a schematic illustration of blade sweep. The circumferential direction of movement of the blade is labeled 520. Adjacent blades in the stage are not shown and adjacent vane stages are not shown. FIG. 12 is similar to FIG. 11, but shows circumferentially interrupted ridges 150 (interrupted by gaps 154. The ridges 150 are interrupted more than the inherent interruption associated with gaps between BOAS segments. The gaps 154 may be full ridge height or partial ridge height (e.g., 30-70% for partial height). The gaps may help the ridges to cut into the blade by increasing exposure of the blade to ends of the ridge segments and assisting in evacuation of blade material. Having only partial depths helps both with structural integrity of the ridges and sealing once the grooves are cut. The ridges may also wear down to the height of the gap bases when fully run in.

Exemplary span of the gaps are smaller than the ridge segments (e.g. 5-40% or 10-30% or about a 5:1 ridge segment to gap length ratio). Exemplary numbers of gaps around the full circumference may be over one hundred. Exemplary gap lengths are 1.0-5.0 mm or 1.5-4.0 mm or about 2 mm. Exemplary ridge segment lengths are at least 5.0 mm or an exemplary 5.0-50.0 mm or 8.0-20.0 mm or about 10.0 mm.

Figure 8:
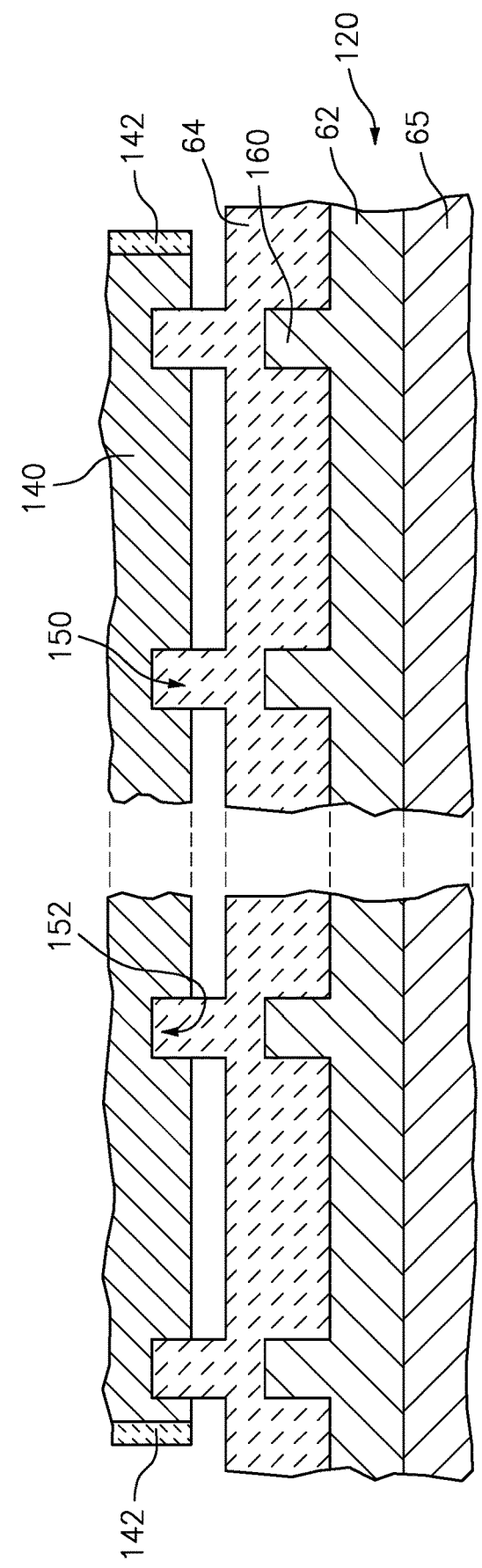
FIG. 8 is a schematic partial sectional view of a second coating on the BOAS segment of FIG. 6 showing blade sweep.

FIG. 8 is a schematic partial sectional view of a second coating on the BOAS segment of FIG. 6 showing blade sweep. Ridges 160 are formed in the bond coat 62 and, in turn, trace through along the layer 64 to form ridges 150.

Figure 9:
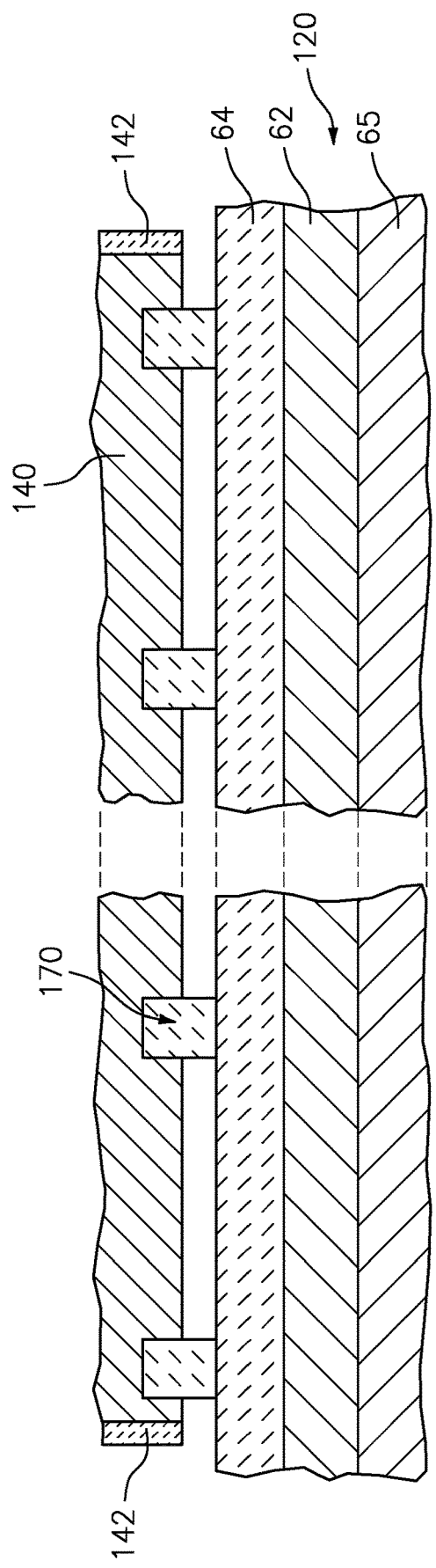
FIG. 9 is a schematic partial sectional view of a third coating on the BOAS segment of FIG. 6 showing blade sweep.

FIG. 9 is a schematic partial sectional view of a third coating on the BOAS segment of FIG. 6 showing blade sweep. Ridges 170 are formed atop the layer 64 of a different material. For example, layer 64 may be a conventionally applied (spray or vapor deposition) conventional ceramic abradable. Ridges 170 may be a more dense (e.g., less porous) ceramic or may be abrasive-filled or may be another abrasive material as described herein. Ridges 170 may be discrete, physically discontinuous from each other so as to be separated from each other by axial gaps of no similar material (as distinguished from merely being thicker regions of a full layer of a given material).

Figure 10:
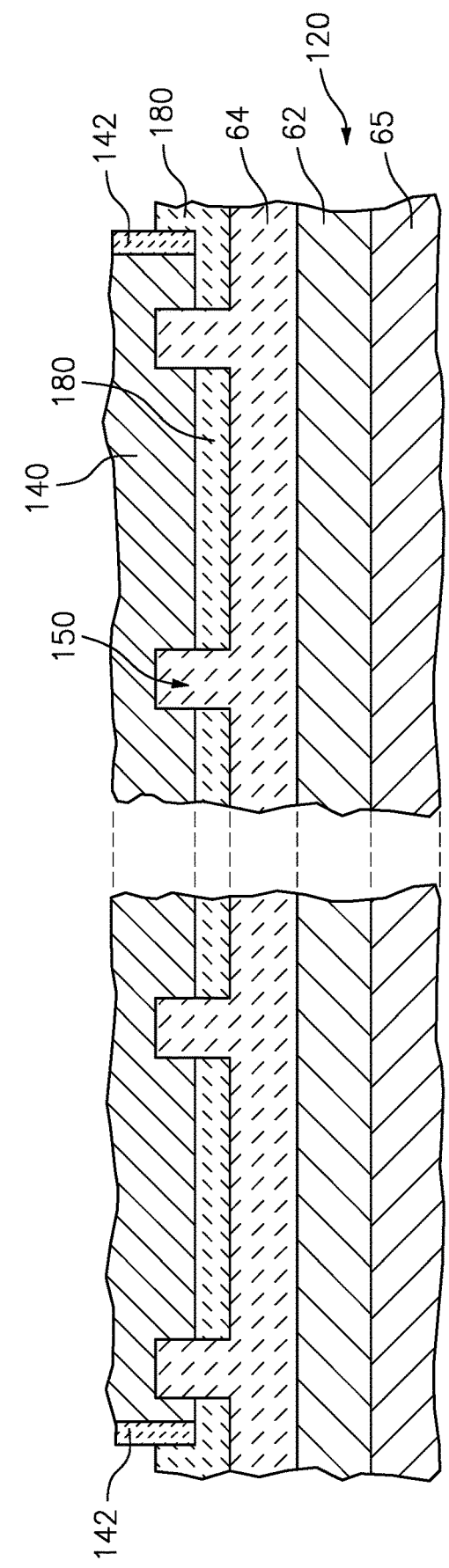
FIG. 10 is a schematic partial sectional view of a fourth coating on the BOAS segment of FIG. 6 showing blade sweep.

FIG. 10 is a schematic partial sectional view of a fourth coating on the BOAS segment of FIG. 6 showing blade sweep. As is discussed further herein, an additional abradable material 180 may be applied atop the coating of FIG. 7 and initially at least partially embed the ridges. The material 180 may quickly be abraded away by the blade (or vane) and leave the ridges cutting into substrate. The material 180 may thus help fill gaps in between the ridges to improve sealing and may exist beyond the blade-swept area for clean flow.

Although potentially identified as abradable, the topcoat material may be less abradable than traditional abradable materials and may even be abrasive, thus "abradable/abrasive".

The ridges may be localized to the blade-swept strip of the component. Immediately ahead of and behind the strip, there are numerous possibilities, some of which include the coating 60 and others which do not. Several variations may form the ridges in or through the layer 64 which, in turn, is covered by a surface layer (not shown) that provides a smooth inner diameter surface. The surface layer may be relatively soft (e.g., more abradable such as through greater porosity or reduced abrasive additive, if any) to allow interaction between the ridges and the blade tip.

For forming metallic ridges that trace through the layer 64, several application techniques are possible. One group involves initially forming the bond coat layer 62 flat/smooth via conventional techniques such as thermal spray (e.g. wire arc spray, flame spray, plasma spray, low pressure plasma spray, high velocity oxy-fuel, etc.), cold spray, cathodic arc, chemical vapor deposition, physical vapor deposition (e.g. sputtering, electron beam, etc.) and various slurry coating processes. Then, metallic ridges may be added such as those formed via micro plasma spray, micro cold spray, or filament or aerosol-based direct-write (also, directed energy methods such as direct metal laser sintering, selective laser sintering or melting, electron beam melting, etc.).

For some designs, a silicon carbide substrate may be particularly relevant to BOAS segments in the turbine section 20 of FIG. 1. Such a substrate ID surface portion may be covered with a silicon bond coat 62 and yttrium disilicate patterns plasma sprayed atop (or as part of) a yttrium disilicate top coat. Thus, the spray may be used to form the entire topcoat or another spray (e.g., having a broader pattern could spray along the full band of the substrate followed by locally spraying the ridges.

The linear features which are circumferential around the seal selectively cut into the airfoil substrate (or 'friable' tipping material). These linear features can also have different properties from the rest of the layer 64 and can be readily produced using direct-write. This type of system would enable further improved erosion and thermal performance since the linear features would transform the typical blade outer air seal essentially into a local knife-edge like seal. Because the seal is expected to selectively cut the blade, it is expected such a configuration also negates the use of expensive blade tipping processes. The linear patterns may be embedded below the surface of the balance of the seal or stand proud from the surface. The features may lie in a plane (more exactly a projected surface such as a cylindrical or frustoconical surface) above the top most layer or be in plane with the top layer. The actual linear patterns may additionally be literally embedded within another coating layer (e.g. a hard phase with patterned geometry may be covered by a soft phase).

Primary benefits in one or more embodiments are improved gas path sealing and durability. In particular, the patterning may allow for use of materials atypical for 'abradables'. For example, a baseline ceramic (e.g., YSZ) having a substantial level of porosity (on the order of 25% or more by volume) to provide abradability may be replaced with a denser (less porous) patterned version of the same ceramic with a porosity no greater than 15% (more narrowly, no greater than 12% or no greater than 10% or no greater than 6%). This may be consistent with porosities used in thermal barrier coatings (TBC). For example, typical yttria stabilized zirconia (e.g., 7YSZ) thermal barrier coatings may have in the 8-10% porosity range. Other of the abrasive coatings (e.g., "nontraditional" materials discussed below) may be easier to get to lower porosities (e.g., 3-5% porosity).

Linear (circumferential) features effectively are in situ formed knife-edge like seals that act by preferential wear of select areas of the blades and also negate the need for expensive blade tipping processes. Use of process technologies such as micro-plasma and micro-cold spray, and filament or other extrusion-based direct write technologies (also, directed energy methods such as direct metal laser sintering, selective laser sintering or melting, electron beam melting, etc.) will allow for the additive manufacturing of the appropriate features (vs. subtractive machining) on the sub-10 mil (250 micrometers) level (e.g., 1.0 mil (25 micrometers) to 10 mil (250 micrometers) width of the ridges, more broadly 1.0 mil to 40.0 mil (1.0 millimeter) or the upper 10.0 mil to 40.0 mil portion of that range. Ridge height to width ratios may broadly vary (e.g., widths of 60% to 250% of heights or having alternative lower limit of 80% or 100% and alternative upper limit of 200%).

The ridges may be discontinuous from each other (e.g. separated by gaps lacking the same material at a lower thickness) or may be separated from each other by reduced thickness portions of the same material.

Because the circumferential ridges function to cut corresponding grooves into the mating surface to form a sealing relationship, the ridges may be close to exactly circumferential (e.g. effective to form corresponding grooves such as varying within 15% or 10% or 5% or 1% of a swept longitudinal span of the blade tip). More particularly, the respective ridges do not axially overlap and their axial variation is less than the associated axial span of the gaps between ridges so that the ridges cut distinct grooves in the mating component. Exemplary circumferential ridges may be along essentially the entire ID face of the BOAS (e.g., at least 300 degrees or at least due to intersegment gaps and the like) or along completely the circumference of the rotor.

Examples: Compressor Material Systems

Compressor Substrates: Co, Ni, or Fe-based superalloys; alumimum alloys, titanium alloys.

Compressor Bond coats: MCrAlY, Ni-based alloys, Ni—Cr alloys, Ni—Cr—Al alloys, Cu-based alloys, aluminum alloys, Al—Si alloys, Co-based alloys, Fe-based alloys.

Compressor 'Top' coats: MCrAlY, Ni-based alloys, Ni—Cr alloys, Ni—Cr—Al alloys, Cu-based alloys, aluminum alloys, Al—Si alloys, Co-based alloys, Fe-based alloys; oxide based ceramics such as yttria stabilized zirconia, or a zirconia phase stabilized with Ca, Mg, Yb, Dy, or other rare earth dopant; Al2O3, MAX phase alloys with the general formula $M_{n+1}AX_n$ (where M=a transition metal such as Ti, A=a group IIIA or IVA or 13 or 14 element such as B, Al, or Si; X=C, or N) such as Ti3AlC2 or Ti3SiC2; and combinations thereof.

Examples: Turbine Material Systems

Turbine Substrates: metallic (Co, Ni, or Fe-based superalloys); ceramic (Si-based ceramic and ceramic matrix composites; oxide based ceramic and ceramic composites).

Turbine Bond coats: for metallic turbine substrates: MCrAlY, Ni-based alloys, Ni—Cr alloys, Ni—Cr—Al alloys, Co-based alloys; for ceramic turbine substrates: Si, silicon-containing alloys, intermetallics such as metal silicides and aluminides; MAX phase alloys; and silicon-containing carbides, nitrides, oxycarbides, nitrides and combinations thereof.

Turbine top coats: for metallic turbine substrates: oxide based ceramics such as yttria stabilized zirconia, or a zirconia phase stabilized with Ca, Mg, Yb, Dy, or other rare earth dopant; gadolinium zirconium oxide or other rare earth oxide (La, Ce, Pr, Nd, Gd, Dy, Yb, Lu) zirconium oxide compound; Al2O3, MAX phase alloys; and combinations thereof; for ceramic turbine substrates: Oxide based ceramics such as yttria stabilized zirconia, or a zirconia phase stabilized with Ca, Mg, Yb, Dy, or other rare earth dopant; gadolinium zirconium oxide or other rare earth oxide (La, Ce, Pr, Nd, Gd, Dy, Yb, Lu) zirconium oxide compound; yttria stabilized hafnium oxide, or a hafnia phase stabilized with Ca, Mg, Yb, Dy, or other rare earth dopant; gadolinium hafnium oxide or other rare earth oxide (La, Ce, Pr, Nd, Gd, Dy, Yb, Lu) hafnium oxide compound; Al2O3, mullite, aluminosilicate, yttrium monosilicate, yttrium disilicate or other rare earth mono- or di-silicate phase (La, Ce, Pr, Nd, Gd, Dy, Yb, Lu), MAX phase alloys; and combinations thereof.

Non-traditional materials may also be used for top coats or local or embedded 'abradable/abrasive' patterns for either the compressor or turbine and may include: diamond; carbides (including silicon carbide, boron carbide, tungsten carbide, chromium carbide); boron nitride (cubic); aluminum oxide; and combinations of the above in a bonded state (e.g. cobalt bonded tungsten carbide or NiCr-bonded chrome carbide, MCrAlY-bonded $ZrO_2$, etc.). These materials may be in the form of abrasive particles such as those used in manufacturing abrasive grinding wheels. The size of these abrasives may be typically in the range of 80 mesh (180 micrometers) to 230 mesh (60 micrometers). Smaller particle sizes can also be used for fine scale patterns manufactured using direct write methods. The volume percentage of the abrasives should be in the range of 30-70%, more narrowly 40-65%, with the rest of the volume taking up by binding material (matrix) or porosity.

Although key uses are in gas turbine engines for thrust propulsion and other gas turbines (e.g., fixed power generation), the sealing may be applicable to other turbomachines and the like such as compressors and pumps.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbomachine sealing component comprising:
a substrate (63; 65) having a circumferential surface (61; 66); and
a coating (60) on the circumferential surface;
wherein:
the coating or a layer thereof is patterned to form circumferential sealing ridges (150; 170) effective to form grooves in something that is circumferentially rubbed against the turbomachine sealing component; and
an abradable material (180) of the coating is in gaps between the ridges.

2. The turbomachine sealing component of claim 1 wherein the patterning is patterning with varying thickness.

3. The turbomachine sealing component of claim 1 wherein the patterning comprises:
a layer formed of discrete ridges (170) physically discontinuous from each other so as to be separated from each other by axial gaps.

4. The turbomachine sealing component of claim 1 wherein the patterning comprises:
a layer formed of discrete ridges (160) physically continuous with each other via less thick portions of the same material.

5. The turbomachine sealing component of claim 1 wherein the coating comprises:
a bondcoat (62); and
an additional layer (64).

6. The turbomachine sealing component of claim 1 wherein:
the varying thickness is between 10 mil and 40 mil.

7. The turbomachine sealing component of claim 1 wherein:
the varying thickness is of ridges having widths of 60% to 250% of heights.

8. The turbomachine sealing component of claim 1 wherein:
the varying thickness comprises ridges of 5.0% to 30% of a blade-swept area.

9. The turbomachine sealing component of claim 1 being a turbomachine rotor having:
said substrate with said surface as an outer diameter surface; and
said coating on the outer diameter surface.

10. A method for manufacturing the turbomachine sealing component of claim 1, the method comprising:
forming the pattern via an additive process.

11. A turbomachine sealing component comprising:
a substrate (63; 65) having a circumferential surface (61; 66); and
a coating (60) on the circumferential surface,
wherein:
the coating or a layer thereof is patterned to form circumferential sealing ridges (150; 170)
an abradable material (180) of the coating is in gaps between the ridges;
the coating comprises a bondcoat (62) and an additional layer (64); and
the additional layer comprises a metallic matrix and an abrasive addition.

12. The turbomachine sealing component of claim 11 wherein the additional layer comprises:
a metallic alloy;
an intermetallic;
a ternary carbide; and/or
an oxide ceramic, a nitride ceramic or a carbide ceramic.

13. The turbomachine sealing component of claim 11 wherein:
the pattern is formed in the bondcoat and trace through along the additional layer to form the ridges.

14. The turbomachine sealing component of claim 11 wherein:
the pattern is formed in the additional layer.

15. The turbomachine sealing component of claim 11 wherein:
the additional layer comprises a ceramic.

16. The turbomachine sealing component of claim 11 wherein:
the additional layer comprises not more than 12% porosity.

17. A method for manufacturing and using a turbomachine sealing component, the turbomachine sealing component comprising:
a substrate (63; 65) having a circumferential surface (61; 66); and
a coating (60) on the circumferential surface,
wherein:
the coating or a layer thereof is patterned to form circumferential sealing ridges (150; 170), the method comprising:
forming said circumferential sealing ridges;

applying an abradable material (180) to at least partially embed the sealing ridges;
rubbing with an adjacent component; and
the rubbing causing the pattern to leave the ridges protruding from the abradable material and cut grooves in tips of blades or in inner diameter tips of vanes.

18. The method of claim 17 wherein:

the turbomachine sealing component is a blade outer airseal; and the adjacent component comprises said tips of said blades.

19. The method of claim 17 wherein:

the grooves are in a blade substrate.

20. The method of claim 17 wherein:

the turbomachine sealing component is a turbomachine rotor; and the adjacent component comprises said vane inner diameter tips.

* * * * *